(12) United States Patent
Yeo et al.

(10) Patent No.: US 12,388,638 B2
(45) Date of Patent: Aug. 12, 2025

(54) METHOD AND APPARATUS FOR PROVIDING SECURE MESSAGING SERVICE

(71) Applicant: SAMSUNG SDS CO., LTD., Seoul (KR)

(72) Inventors: Seung Min Yeo, Seoul (KR); Ji Min Son, Seoul (KR); Da Hye Wi, Seoul (KR); Do Yeon Koo, Seoul (KR); Dae Yeoul Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 225 days.

(21) Appl. No.: 18/200,203

(22) Filed: May 22, 2023

(65) Prior Publication Data

US 2023/0388112 A1   Nov. 30, 2023

(30) Foreign Application Priority Data

May 26, 2022  (KR) .................. 10-2022-0064771
Jun. 30, 2022  (KR) .................. 10-2022-0080348

(51) Int. Cl.
*H04L 9/08*  (2006.01)
*H04L 9/30*  (2006.01)

(52) U.S. Cl.
CPC ............ *H04L 9/088* (2013.01); *H04L 9/30* (2013.01)

(58) Field of Classification Search
CPC .................................. H04L 9/088; H04L 9/30
See application file for complete search history.

(56) References Cited

U.S. PATENT DOCUMENTS

| | | | | |
|---|---|---|---|---|
| 2010/0128879 A1* | 5/2010 | Zou | ........................ | H04L 9/0836 380/282 |
| 2012/0099729 A1* | 4/2012 | Tian | ........................ | H04L 63/061 380/279 |
| 2013/0173912 A1* | 7/2013 | Cui | ........................ | H04L 9/0825 713/175 |
| 2017/0012950 A1* | 1/2017 | Kim | ........................ | H04W 4/12 |
| 2019/0020631 A1* | 1/2019 | Leavy | ................... | H04L 9/0825 |

FOREIGN PATENT DOCUMENTS

| KR | 10-2001-0016233 A | 3/2001 |
|---|---|---|
| KR | 10-1684919 B1 | 12/2016 |
| KR | 10-1767958 B1 | 8/2017 |
| KR | 10-2048750 B1 | 11/2019 |
| KR | 10-2021-0014554 A | 2/2021 |
| KR | 10-2293610 B1 | 8/2021 |
| KR | 10-2021-0111978 A | 9/2021 |
| KR | 10-2306308 B1 | 9/2021 |
| KR | 10-2395799 B1 | 5/2022 |

OTHER PUBLICATIONS

The European Search Report issued on Oct. 9, 2023 by the European Patent Office for European Patent Application No. 23174690.0.

* cited by examiner

*Primary Examiner* — Hieu T Hoang
(74) *Attorney, Agent, or Firm* — Sughrue Mion, PLLC

(57) ABSTRACT

Provided are a method and an apparatus for providing a secure message service. The method according to some embodiments includes inquiring a public key of a counterpart user to be invited to a chat room, generating an encryption key related to the chat room using the inquired public key and a private key of a chat room opening user, and transmitting the encryption key to be delivered to a terminal of the counterpart user.

13 Claims, 14 Drawing Sheets

METHOD AND APPARATUS FOR PROVIDING SECURE MESSAGING SERVICE

CROSS-REFERENCE TO RELATED APPLICATION(S)

This application claims the benefit of Korean Patent Application No. 10-2022-0064771, filed on May 26, 2022, and Korean Patent Application No. 10-2022-0080348, filed on Jun. 30, 2022, in the Korean Intellectual Property Office, the disclosures of which are incorporated herein by reference in their entireties.

BACKGROUND

1. Field

The present disclosure relates to a method and an apparatus for providing a secure messaging service. More specifically, it relates to a method for encrypting a message and transmitting and receiving it, and an apparatus, to which the method is applied.

2. Description of the Related Art

Messaging services such as instant messaging services are provided. In consideration of security vulnerabilities of universal instant messaging services, secure instant messaging services supplemented in terms of security are also provided.

However, even in a secure instant messaging service, only an entry password or an authentication token for entry is required, and if such an entry password or authentication token is leaked, conversation contents in the chat room may be leaked.

Therefore, it is required to provide a secure messaging service method that may be applied only between users in the same chat room and relieve anxiety of chat room users who are sensitive to the security of conversation contents.

SUMMARY

A technical problem to be solved by some embodiments of the present disclosure is to provide a secure messaging method for encrypting a message using an encryption key dependent on a chat room member and an apparatus to which the method is applied.

Another technical problem to be solved by some embodiments of the present disclosure is to provide a method for providing a different encryption key for encrypting a message according to a terminal of a chat room member and an apparatus to which the method is applied.

Another technical problem to be solved by some embodiments of the present disclosure is to provide a secure messaging method for encrypting a message using an encryption key that is newly updated when a new chat room member joins, and an apparatus to which the method is applied.

Another technical problem to be solved by some embodiments of the present disclosure is to provide a secure messaging method that does not allow unauthorized terminals to access by limiting the number of approved terminals for each chat room member to one, and an apparatus to which the method is applied.

The technical problems of the present disclosure are not limited to the technical problems mentioned above, and other technical problems not mentioned will be clearly understood by those skilled in the art from the following description.

According to an aspect of the present disclosure, there is provided a method performed by a computing system for transmitting and receiving a secure message. The method includes inquiring a public key of a counterpart user to be invited to a chat room, generating an encryption key related to the chat room based on the inquired public key and a private key of a chat room opening user, and transmitting the encryption key to be delivered to a terminal of the counterpart user.

In some embodiments, the inquired public key is generated by the terminal of the counterpart user based on the terminal of the counterpart user logging in to a secure messaging service, and registered in a service server.

In some embodiments, the generating the encryption key may include transmitting a chat room invitation message to the terminal of the counterpart user, and in response to receiving an approval response to the chat room invitation message, identifying a public key of a counterpart user who transmitted the approval response among the inquired public key, and generating the encryption key based on the identified public key and the private key.

In some embodiments, the generating the encryption key may include generating an encryption key related to the chat room further based on a timestamp at generation time point of the encryption key.

In some embodiments, the generating the encryption key may include transmitting a chat room invitation message to the terminal of the counterpart user, and based on receiving an approval response to the chat room invitation message, generating the encryption key further based on a password included in the approval response.

In some embodiments, the method may further include receiving an invitation command for a new user, updating the encryption key related to the chat room by based on a public key of the new user, a public key of the counterpart user of the chat room, and a private key of the chat room opening user, and transmitting the updated encryption key to be delivered to the terminal of the counterpart user and a terminal of the new user.

According to another aspect of the present disclosure, there is provided a method performed by a computing system for transmitting and receiving a secure message. The method includes receiving a chat room invitation request for a second user from a terminal of a first user, wherein the second user is a user who has registered a plurality of user terminals, transmitting the chat room invitation request to each of the plurality of user terminals of the second user, receiving an approval signal for the chat room invitation request from one of the plurality of user terminals of the second user, and transmitting a notification message deletion command for the chat room invitation request to remaining user terminals, other than an approval terminal that transmitted the approval signal, among the plurality of user terminals of the second user.

According to yet another aspect of the present disclosure, there is provided a method performed by a computing system for transmitting and receiving a secure message. The method includes generating a first encryption key related to a first chat room for a conversation with a first counterpart user based on a public key of the first counterpart user and a private key of a chat room opening user, encrypting and transmitting a message input to the first chat room based on the first encryption key, generating a second encryption key related to a second chat room for a conversation with the first counterpart user and a second counterpart user based on the public key of the first counterpart user, a public key of the second counterpart user, and the private key of the chat room opening user, and encrypting and transmitting a message input to the second chat room based on the second encryption key.

According to yet another aspect of the present disclosure, there is provided an apparatus for transmitting and receiving a secure message. The apparatus includes at least one processor; and at least one memory configured to store computer program executable by the at least one processor, wherein the computer program, when executed by the at least one processor, causes the at least one processor to perform: receiving and storing a public key from a terminal of a user; in response to a public key inquiry request received from a terminal of a first user who opens a chat room, transmitting a public key of a counterpart user who is invited to the chat room to the terminal of the first user; receiving an encryption key related to the chat room from the terminal of the first user; and delivering the received encryption key to the terminal of the counterpart user, wherein the encryption key is generated based on a public key of the counterpart user and a private key of the first user.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
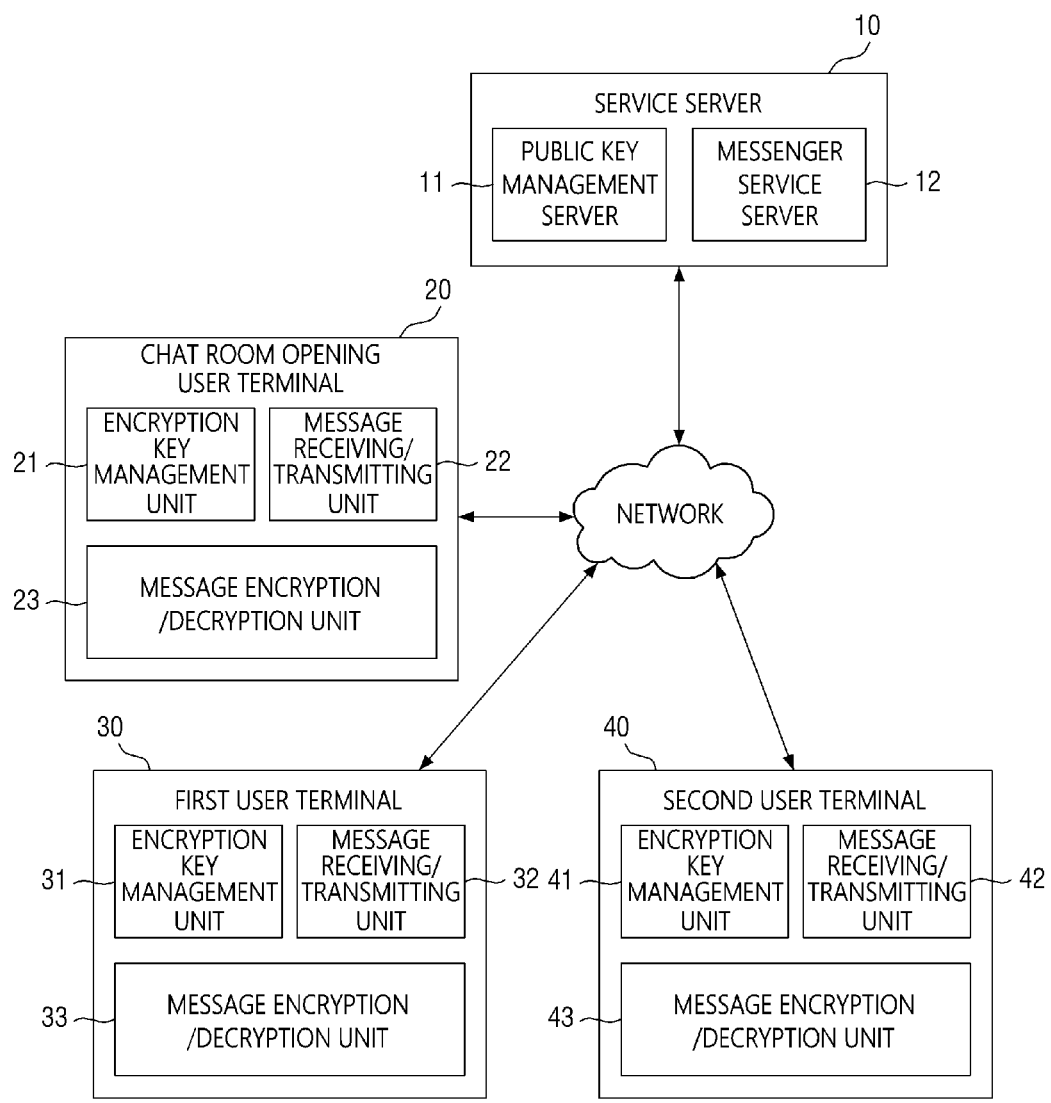
FIG. 1 is a block diagram of a secure messaging service providing system according to an embodiment of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will be described with reference to the attached drawings.

First, a secure messaging service providing system according to an embodiment of the present disclosure will be described with reference to FIG. 1. Hereinafter, in the present description, the secure messaging service providing system will be referred to as a 'secure message transmission/reception system.'

The secure message transmission/reception method according to the present embodiment may be performed by one or more computing systems. Hereinafter, in describing the method according to the present embodiment, description of a subject of performing some operations may be omitted. At this time, it should be understood that the performing subject of the corresponding operation is the computing system.

FIG. 1 is a block diagram of a secure message transmission and reception system according to an embodiment of the present disclosure.

As shown in FIG. 1, the secure message transmission/reception system according to the present embodiment may include a service server 10 and user terminals 20, 30, and 40. For convenience of understanding, FIG. 1 shows user terminals divided into a chat room opening user's terminal 20 and counterpart user's terminals 30 and 40 invited to the chat room.

Each of the user terminals 20, 30, and 40 may comprise encryption key management units 21, 31, and 41 that generate and store encryption keys and message receiving/transmitting units 22, 32, and 42 that exchange messages, and message encryption/decryption units 23, 33, and 43 that display messages to be exchanged with encryption and decryption.

The encryption key management units 21, 31, 41 may generate a public key and a private key when each of the user terminals 20, 30, and 40 logs in to the secure messaging service, and transmit the generated public key to a public key management server 11.

The message receiving/transmitting units 22, 32, and 42 may transmit/receive messages between the user terminals 20, 30, and 40 or between the user terminals 20, 30, and 40 and the service server 10.

The message encryption/decryption units 22, 33, and 43 may convert a message received from the user into an encrypted message using an encryption key when transmitting the message. Also, when receiving an encrypted message, the received message may be decrypted using the encryption key.

The encryption key may be generated by the chat room opening user terminal 20. That is, the encryption key may be generated dependently on the chat room, and may be generated by the terminal 20 of the user who opened the chat room. In addition, the chat room opening user terminal 20 may generate the encryption key using a private key of the chat room opening user and public keys of one or more counterpart users. In addition, the encryption key may be generated in various ways, and detailed encryption key generation methods will be described later.

In addition, as shown in FIG. 1, the service server 10 is connected to each of the user terminals 20, 30, and 40 through a network, and may comprise the public key management server 11 and the messenger service server 12. Each of the public key management server 11 and the messenger service server 12 may be implemented in the form of a software module. In addition, each of the public key management server 11 and the messenger service server 12 may be implemented as an individual virtual machine provisioned in a cloud environment.

The public key management server 11 may receive and store a public key from each user terminal 20, 30, or 40. In some embodiments, each user terminal 20, 30, 40 may generate a public key and a private key when logging into the secure messaging service. That is, the public key management server 11 may receive a public key from each user terminal 20, 40 at the time of logging in to the secure messaging service.

In addition, the stored public key of the counterpart user's terminal 30 or 40 may be provided in response to a public key inquiry request for the counterpart user's terminal 40 from the chat room opening user's terminal 20.

In addition, each user terminal 20, 30, 40 may request the public key management server 11 to generate a public key and a private key when logging in to the secure messaging service. At this time, each user terminal 20, 30, 40 may transmit the terminal identification information of each user terminal 20, 30, 40 to the public key management server 11 while requesting the generation of a public key and a private key. At this time, the public key management server 11 may transmit the generated public key and private key to each user terminal 20, 30, 40, and store the public key, but completely delete the private key.

Also, each user terminal 20, 30, 40 may periodically generate a public key and a private key even after logging in to the secure messaging service, and transmit the generated public key to the public key management server 11.

Also, each user terminal 20, 30, 40 may periodically request the public key management server 11 to generate a public key and a private key even after logging in to the secure messaging service.

The messenger service server 12 may generate a chat room by receiving a chat room generation request from the terminal 20 of the chat room opening user. In addition, the messenger service server 12 may perform a function of delivering messages related to generation of a chat room and user configuration to each user terminal 20, 30, 40 such as transmitting a chat room invitation message to the terminals 30 and 40 of the counterpart users who are expected chat room participants.

In some embodiments, the service server 10 may store only a minimum number of transmitted and received messages. For example, the service server 10 may store messages transmitted and received through a specific chat room only until all member terminals of the specific chat room download them.

In some other embodiments, the service server 10 may perform only operations related to chat room management, such as generation and deletion of chat rooms, and relay message transmission and reception through the chat room so that each member terminal of the chat room directly transmits and receives in a peer-to-peer (p2p) method.

That is, the service server 10 stores only a minimum number of messages or does not participate in message transmission/reception itself, thereby minimizing the possibility of leakage of conversation contents due to hacking of the service server 10. Even if a message is leaked due to hacking of the service server 10, the message is encrypted and the encryption key is different for each chat room, so the possibility of leaking the encryption key is very low, and eventually the possibility of leaking the original message is very low.

Figure 2:
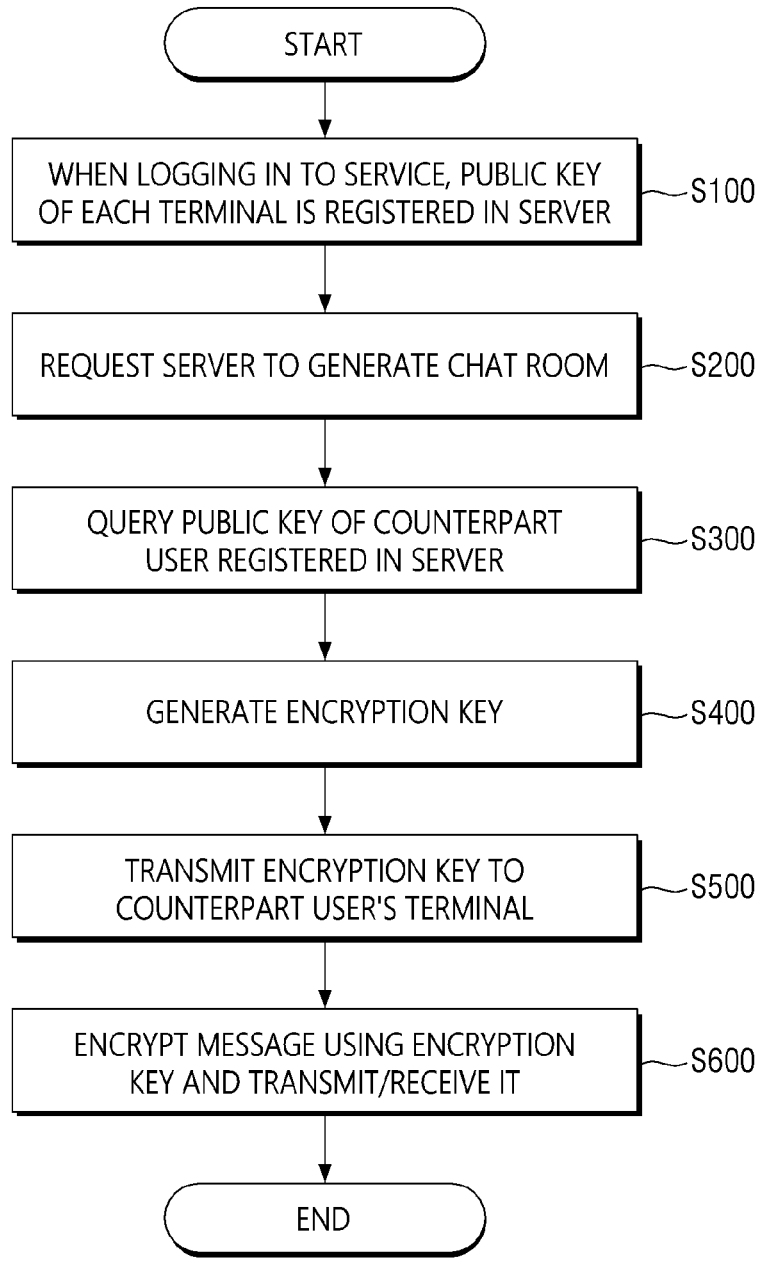
FIG. 2 is a flowchart of a method for transmitting and receiving a secure message according to another embodiment of the present disclosure.

Next, the overall secure message transmission/reception method according to the present disclosure will be described with reference to FIGS. 2 to 4. The secure message transmission/reception method according to this embodiment may be performed by one or more computing devices. That is, in the secure message transmission/reception method according to the present embodiment, all operations may be performed by one computing device, or some operations may be performed by another computing device.

For example, some operations may be performed by a first server system and other operations may be performed by a second server system. Also, for example, some operations may be performed by a server system and other operations may be performed by a user terminal. For example, some operations may be performed by a first user terminal and other operations may be performed by a second user terminal.

Also, as the server system is implemented on a cloud computing node, operations performed by one server system may also be divided and performed on a plurality of cloud computing nodes. Hereinafter, in describing the secure message transmission/reception method according to the present embodiment, description of a subject performing some operations may be omitted, and in this case, the performing subject may be the chat room opening user terminal 20 described with reference to FIG. 1.

Hereinafter, a secure message transmission/reception method according to another embodiment of the present disclosure will be described with reference to FIGS. 2 to 4. First, it will be described with reference to FIG. 2.

In step S100, each user terminal may generate a public key and a private key. For example, each user terminal may generate a public key and a private key when logging in to a secure messaging service. Among them, the public key may be registered in a public key management server. Unlike the public key, the private key may be stored in a secure region within each user terminal.

At least one of the public key and the private key may be generated using identification information of each user terminal. For example, the identification information of the user terminal may include a serial number, MAC address, IMEI value, etc., and this description is illustrative and is not limited thereto, and it will be understood that it is a unique value dependent on the user terminal.

Also, in some embodiments, at least one of the public key and the private key may be generated using biometric information of a user of each user terminal. For example, as the biometric information, at least some of iris information, fingerprint information, and voiceprint information may be used.

Also, in some embodiments, at least one of the public key and the private key may be generated further using a timestamp. For example, the timestamp may be acquired at the time of logging in to the secure messaging service.

Also, in some embodiments, at least one of the public key and the private key may be generated by an asymmetric encryption algorithm. At this time, the public key encryption method may include DSA (Digital Signature Algorithm), RSA (Rivest Shamir Adleman), ECC (Elliptic Curve Cryptography), etc. as asymmetric encryption algorithms, but this description is illustrative and not limited thereto.

Also, in some embodiments, each user terminal may periodically or non-periodically regenerate a public key and a private key even after logging in, and register the public key among them in the public key management server. For example, each user terminal may regenerate a public key and a private key periodically every day.

Also, for example, terminals that have generated a chat room among user terminals may regenerate a public key and a private key. As described above, the encryption key of the chat room may be generated using the private key of the chat room opening user and the public key of the counterpart. By having each user terminal regenerate the public key and the private key when generating the chat room, the encryption key may be frequently updated. That is, security of the messaging service may be strengthened by frequently updating the encryption key of the chat room even if the same opening user and counterpart become members of the chat room.

In step S200, the messenger service server may generate a chat room in response to the chat room opening user terminal transmitting a chat room generation request to the messenger service server. The chat room generation request may include information about the counterpart user. The messenger service server may transmit a chat room invitation message to the terminal of the counterpart user.

In step S300, the public key management server may query the public key of the counterpart user and transmit the inquired public key of the counterpart user to the chat room opening user terminal. The transmission of the public key of the counterpart user by the public key management server to the chat room opening user terminal may be performed in conjunction with the messenger service server receiving the chat room generation request, or also may be performed in response to the chat room opening user terminal transmitting the chat room generation request to the messenger service server and then transmitting a counterpart public key inquiry request to the public key management server.

In step S400, the chat room opening user terminal may generate an encryption key for the chat room using the inquired public key of the counterpart user terminal and the private key of the chat room opening user. At this time, it is preferable that the generated encryption key is used only for messages input to the chat room.

That is, even if the same chat room opening user generates the first chat room and the second chat room having the same members, it is preferable that the encryption key for the first chat room and the encryption key for the second chat room are different from each other. To this end, the chat room opening user terminal may generate an encryption key using the public key of the counterpart user terminal, the private key of the chat room opening user, and a timestamp.

Alternatively, in some other embodiments, chat rooms having the same members and generated by the same chat room opening user may have the same encryption key. In this case, as described above, the encryption key may be generated with only the private key of the chat room opening user and the public key of the counterpart user.

Hereinafter, with reference to FIG. 3, an operation related to generation of an encryption key in step S400 will be described in detail.

Figure 3:
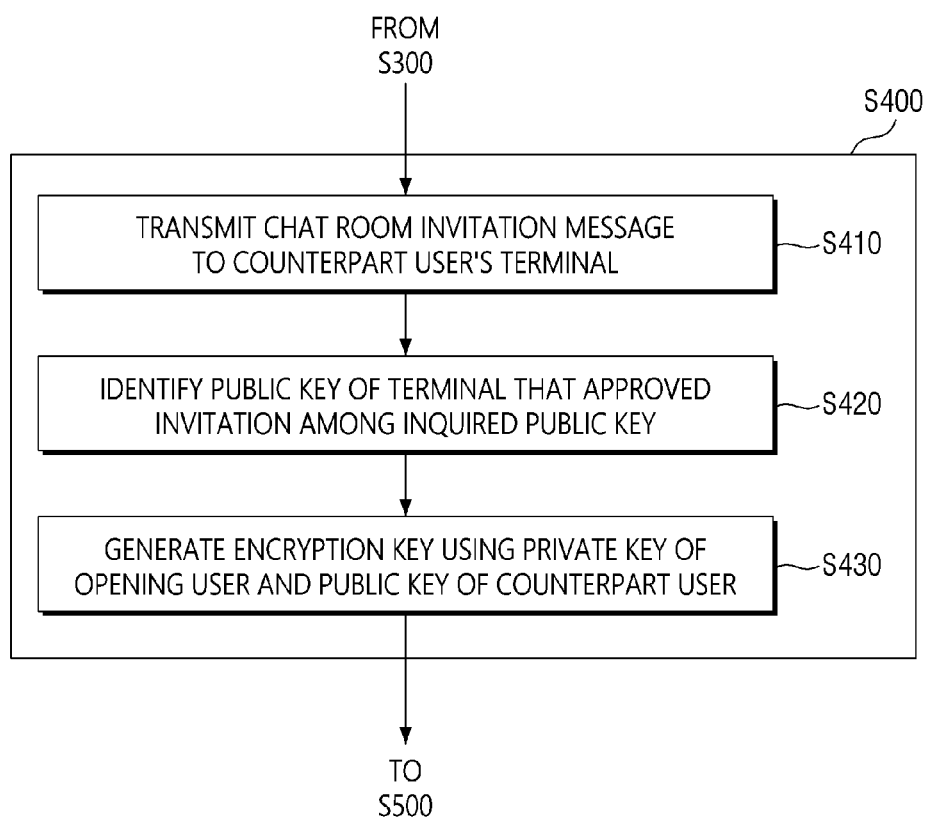
FIG. 3 is a detailed flowchart for describing in detail some of the operations described with reference to FIG. 2.
Figure 4:
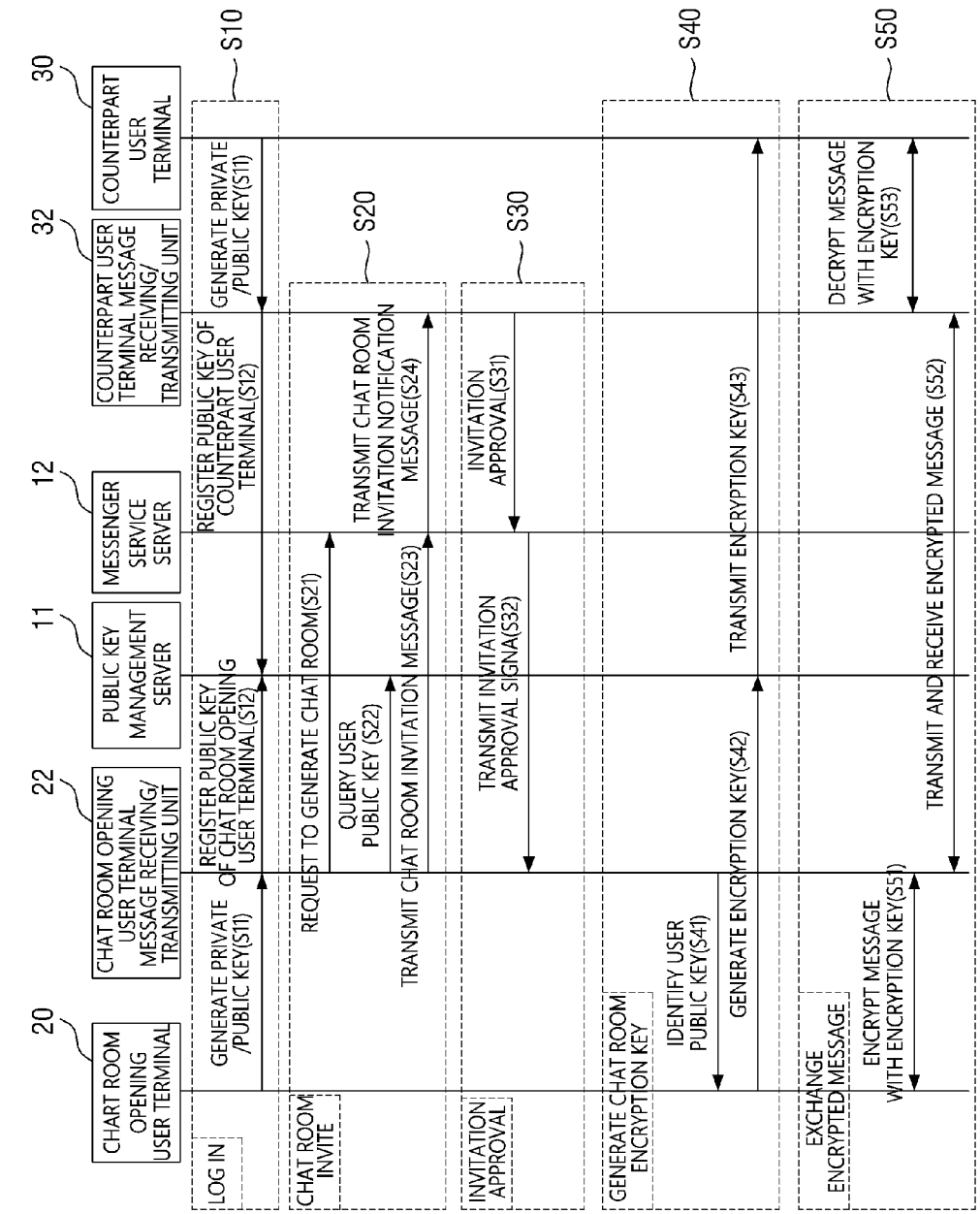
FIG. 4 is a signal flow diagram of the method for transmitting and receiving the secure message described with reference to FIG. 2.

As shown in FIG. 3, the public key of the counterpart user used to generate the encryption key may be limited to the public key of the user who transmitted the invitation approval signal to the chat room invitation message transmitted by the chat room opening user terminal (S410). That is, the public key management server may identify the public key of the user who has transmitted the invitation approval signal from among the inquired public keys of the counterpart users (S420), and transmit only the identified public key to the chat room opening user terminal. The chat room opening user terminal may generate a chat room encryption key using a private key of the chat room opening user and a public key of the user who transmitted the invitation approval signal (S430).

Again, it will be described with reference back to FIG. 2.

The chat room opening user terminal may deliver the generated encryption key to the counterpart user terminal through the messenger service server (S500). Accordingly, each user terminal participating in the chat room holds the encryption key.

As described above, each user terminal may have a message encryption/decryption unit. The message encryption/decryption unit may encrypt the original message received by each user terminal. For example, the message encryption/decryption unit may encrypt an original message in a symmetric encryption method using an Advanced Encryption Standard (AES-256) algorithm, a Secure Hash Algorithm (SHA) algorithm, or the like, and decrypt the encrypted message.

Thereafter, each user terminal may encrypt the original text of the message using the encryption key, transmit the encrypted message to the messenger service server, and decrypt the encrypted message using the encryption key (S600).

At this time, according to some embodiments, the original text of the message input to each user terminal may include a file in the form of text, image, or voice, and this description is illustrative and not limited thereto.

In some embodiments, the encryption key may be deleted along with the chat room upon leaving the chat room or deleting the chat room. Also, in some embodiments, the encryption key may be deleted upon logging out of the messenger service. At this time, since the encryption key is removed along with leaving the chat room or deleting the chat room, it is impossible to check the original message, and even when logging out and logging in again, it will be impossible to check the original message.

Meanwhile, in some embodiments, property information of a chat room may be set.

The property information of the chat room may include a password of the chat room, information about a chat room opening user's terminal and chat room user's terminals, and information about an encryption key. In addition, for example, each user's profile picture, name, chat room opening user information, information on joining time to chat room, and message statistics information of each user that may only be used within the corresponding chat room may be further included as the chat room property information.

Also, the property information of the chat room may be encrypted using an encryption key of the chat room, and the encrypted chat room property information may be transmitted to terminals of chat room users. Also, the terminal of the chat room user can decrypt and display the encrypted property information of the chat room using the encryption key. Accordingly, the property information of the chat room, which may include sensitive content, will not be able to be identified by terminals other than the chat room user.

Hereinafter, for better understanding, a secure message transmission/reception method according to the present embodiment will be described in detail with reference to related drawings. FIG. 4 is a signal flow diagram of a method for transmitting and receiving a secure message according to the present embodiment.

The login related operation (S10) will be described. The chat room opening user's terminal 20 and the counterpart user's terminal 30 generate a private key and a public key at the time of login (S11), and register the generated public key in the public key management server 11 (S12).

The chat room invitation related operation (S20) will be described. The message receiving/transmitting unit 22 of the chat room opening user terminal transmits a chat room generation request to the messenger service server 12 (S21). In addition, the message receiving/transmitting unit 22 of the chat room opening user terminal transmits to the public key management server 11 a public key inquiry request for a counterpart user to be invited to the chat room (S22).

The public key management server 11 may transmit the public key of the counterpart user to be invited to the chat room to the message receiving/transmitting unit 22 of the chat room opening user terminal.

In addition, the message receiving/transmitting unit 22 of the chat room opening user terminal transmits a chat room invitation message including identification information on a counterpart user to be invited to the chat room to the messenger service server 12 (S23). The messenger service server 12 transmits the chat room invitation message to the terminal of the counterpart user (S24).

An invitation approval related operation (S30) will be described. Among the counterpart users invited by the chat room opening user, the message receiving/transmitting unit 32 of the invitation approval user terminal transmits an invitation approval signal to the messenger service server 12 (S31). The messenger service server 12 will transmit information about the counterpart user who has approved the invitation to the message receiving/transmitting unit 22 of the chat room opening user's terminal.

In some embodiments, the message receiving/transmitting unit 32 of the invitation approval user terminal may receive an invitation approval password from the user, and transmit the invitation approval password to the message receiving/transmitting unit 22 of the chat room opening user terminal through the messenger service server 12. The invitation approval password is encrypted by the public key of the invitation approval user, and the encrypted invitation approval password may be transmitted to the message receiving/transmitting unit 22 of the chat room opening user terminal through the messenger service server 12.

A chat room encryption key generation related operation (S40) will be described. The chat room opening user terminal identifies the public key of the counterpart user who has approved the invitation from among the public keys of the chat room inviting user received from the public key management server 11 (S41). The chat room opening user terminal generates an encryption key using the private key of the chat room opening user and the public key of the counterpart user who has approved the invitation, and shares the generated encryption key with the counterpart user terminal 30 through the public key management server 11 (S42, S43).

In some embodiments, the chat room opening user terminal may generate an encryption key using the private key of the chat room opening user, the public key of the counterpart user who has approved the invitation, and the invitation approval password.

In some embodiments, the chat room opening user terminal may generate an encryption key using the private key of the chat room opening user, the public key of the counterpart user who approved the invitation, and the timestamp obtained at the time of encryption key generation.

In some embodiments, the chat room opening user terminal may generate an encryption key using the private key of the chat room opening user, the public key of the counterpart user who has approved the invitation, the invitation approval password, and a timestamp obtained at the time of encryption key generation.

An encrypted message exchange related operation (S50) will be described. The participant terminals 20 and 30 of the chat room may encrypt the input message (S51 and S53) and transmit and receive the encrypted message (S52).

Next, a secure message transmission/reception method according to another embodiment of the present disclosure will be described with reference to FIGS. 5 and 6. A method for transmitting and receiving a secure message according to another embodiment of the present disclosure includes adding a new user terminal to an existing chat room after generating the chat room.

Figure 5:
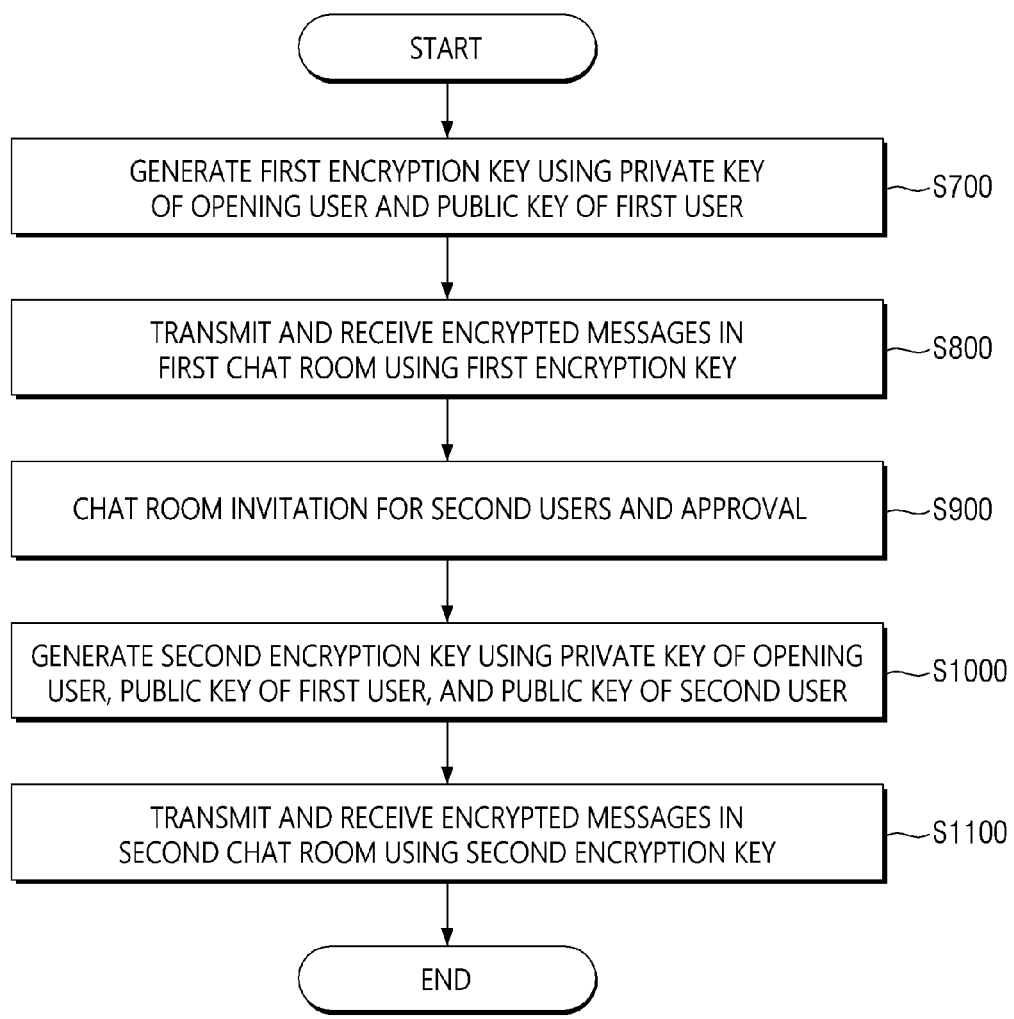
FIG. 5 is a flowchart of a method for transmitting and receiving a secure message according to another embodiment of the present disclosure.
Figure 6:
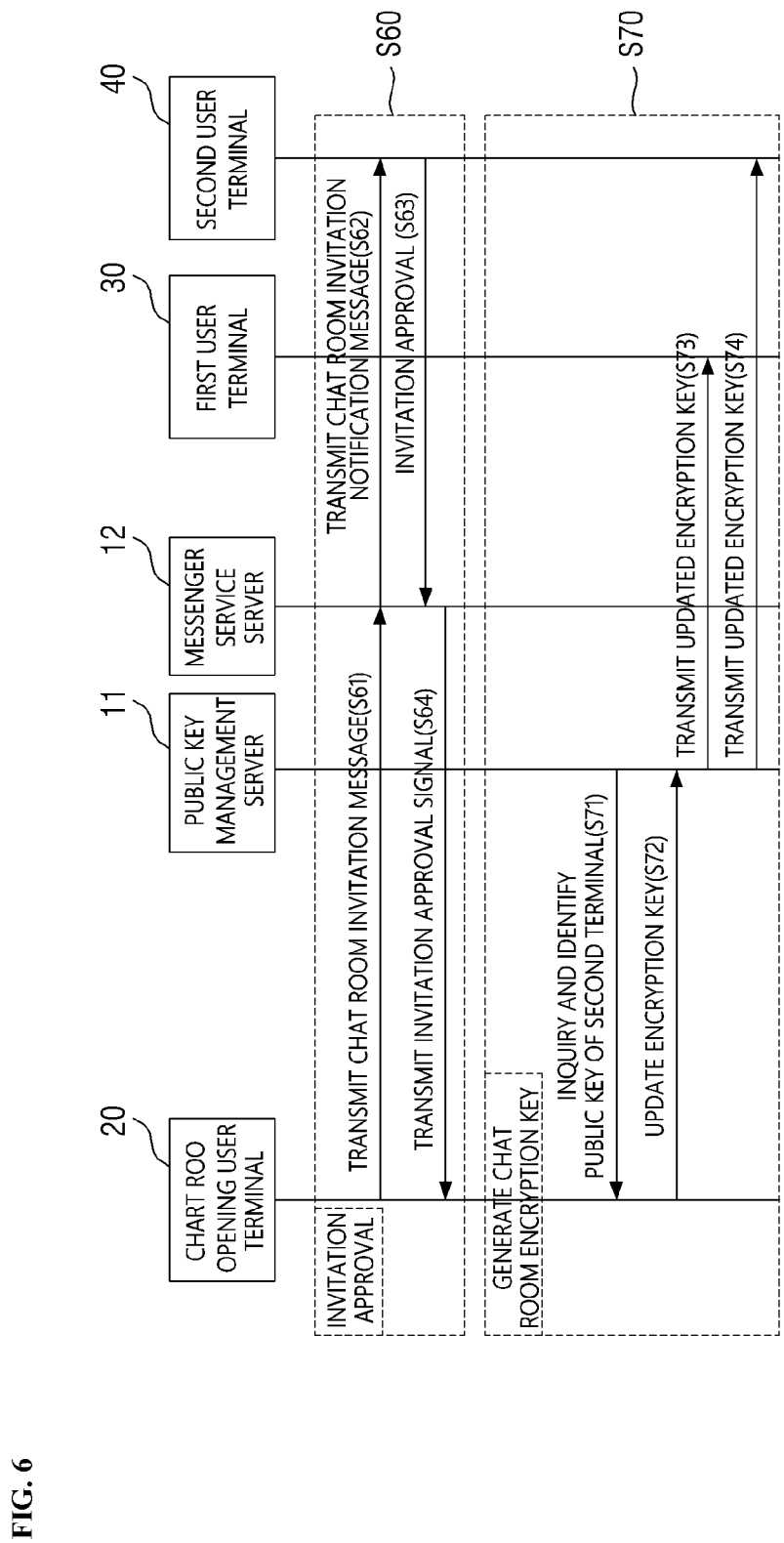
FIG. 6 is a signal flow diagram of the method for transmitting and receiving the secure message described with reference to FIG. 5.

FIG. 5 is a flowchart of a method for transmitting and receiving a secure message according to another embodiment of the present disclosure, and FIG. 6 is a signal flowchart of the method for transmitting and receiving a secure message described with reference to FIG. 5. Hereinafter, in another embodiment of the present disclosure with reference to FIGS. 5 and 6, the existing 'counterpart user' is abbreviated as 'first user,' and the 'new user' is abbreviated as 'second user.'

In step S700, the chat room opening user's terminal may generate a first encryption key using the private key of the chat room opening user terminal and the public key of the first user's terminal. Among them, the public key may be registered in a public key management server, and the private key may be stored in a secure region inside the chat room opening user terminal.

In step S800, the chat room opening user's terminal 20 may transmit a chat room invitation message to the terminal 40 of the second user who is a new user (S61).

At this time, the terminal 20 of the chat room opening user may generate a second encryption key by additionally using the public key of the terminal 40 of the second user who has approved the invitation (S63) in response to the chat room invitation message (S1000). Thereafter, between the terminals 20, 30, and 40 of the second chat room, messages encrypted using the second encryption key may be transmitted and received (S1100).

At this time, the generated second encryption key is generated using the private key of the terminal 20 of the chat room opening user, the public key of the terminal 30 of the first user, and the public key of the terminal 40 of the second user (S72), it may be understood to be updated from the first encryption key. The updated second encryption key may be transmitted to the first user's terminal 30 and the second user's terminal 40 (S73).

At this time, the second chat room, in which the second encryption key is used, is not a chat room newly generated by the addition of the second user's terminal 40, but is one, in which only the configuration of the chat room user's terminal is added in the first chat room. It may be also understood to be updated from the first chat room.

In this way, as the terminal 40 of the second user who is a new user is newly added as a member terminal of the first chat room, the existing first encryption key is no longer used and the newly generated second encryption key is used. Therefore, a conversation before the second user's terminal 40 is included as a member of the chat room may not be decoded in the second user's terminal.

That is, after the point at which the second chat room is generated, the use of the first encryption key used to encrypt and decrypt messages in the existing first chat room becomes unavailable, and messages may be encrypted and decrypted only through the transmitted and received second encryption key.

So far, the embodiment, in which a first encryption key is generated using the private key of the terminal 20 of the chat room opening user and the public key of the terminal 30 of the first user (S700), and the terminal 40 of the second user who is a new user is added in the step of transmitting and receiving the encrypted message in the first chat room using the first encryption key (S800), has been described.

That is, the steps of updating the first chat room to the second chat room by the chat room invitation approval (S900) of the second user terminal 40, who is a new user, and generating the second encryption key by further using the public key of the second user terminal 40 in the configuration of the first encryption key, have been described in sequence. For better understanding, it will be described in more detail with reference to related drawings.

FIG. 6 is a signal flow diagram of the secure message transmission/reception method described with reference to FIG. 5.

Referring to FIG. 6, the process of transmitting a chat room invitation message to the terminal 40 of the second user who is a new user (S61, S62), generating a second encryption key (S72) by identifying (S71) and using the public key of the second user terminal 40 who approved the invitation from the server (S63, S64), and encrypting and decrypting a message using the second encryption key, and transmitting/receiving the message is shown step by step.

On the other hand, as described above, in the present embodiment, the private key of the chat room opening user and the public key of the counterpart as well as the timestamp obtained at the time of generating the encryption key or the invitation approval password input by the counterpart upon invitation approval are used to generate the encryption key.

As such, the secure message transmission/reception method according to the present embodiment may be performed by connecting one chat room opening user terminal 20 and one counterpart user terminal 30. Also, it may be performed by simultaneously connecting the terminal 20 of one chat room opening user and the terminals of different counterpart users.

Hereinafter, with reference to FIGS. 7 to 10, a secure message transmission/reception system and method according to still other embodiments of the present disclosure will be described. Hereinafter, how the embodiments of the present disclosure operate when one user registers and uses a plurality of terminals in the messenger service server will be described.

Figure 7:
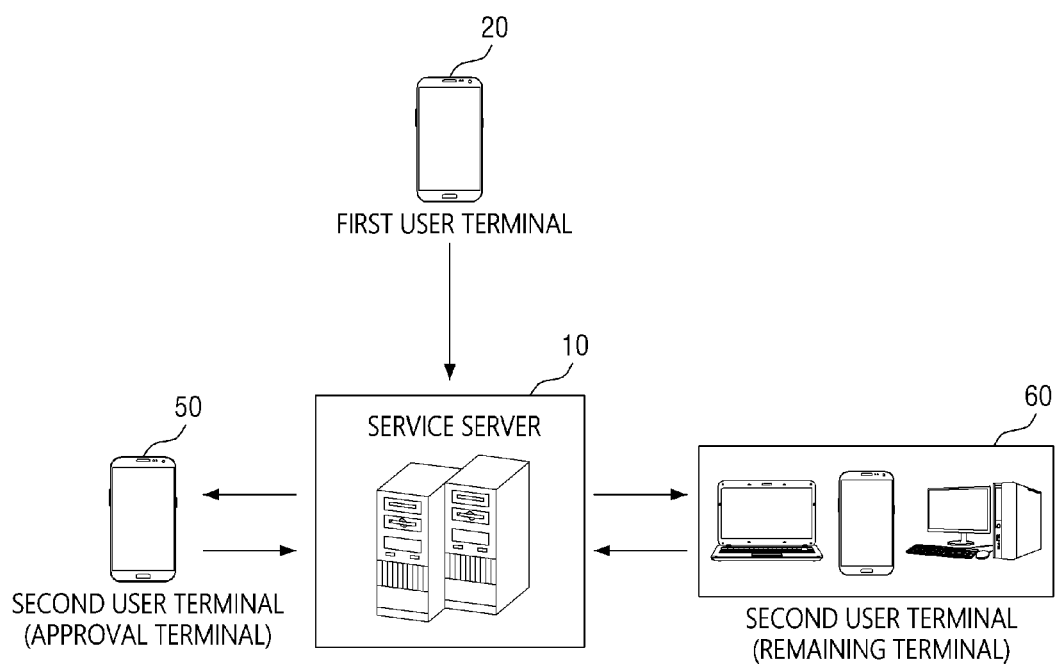
FIG. 7 is a block diagram of a secure messaging service providing system according to another embodiment of the present disclosure.
Figure 8:
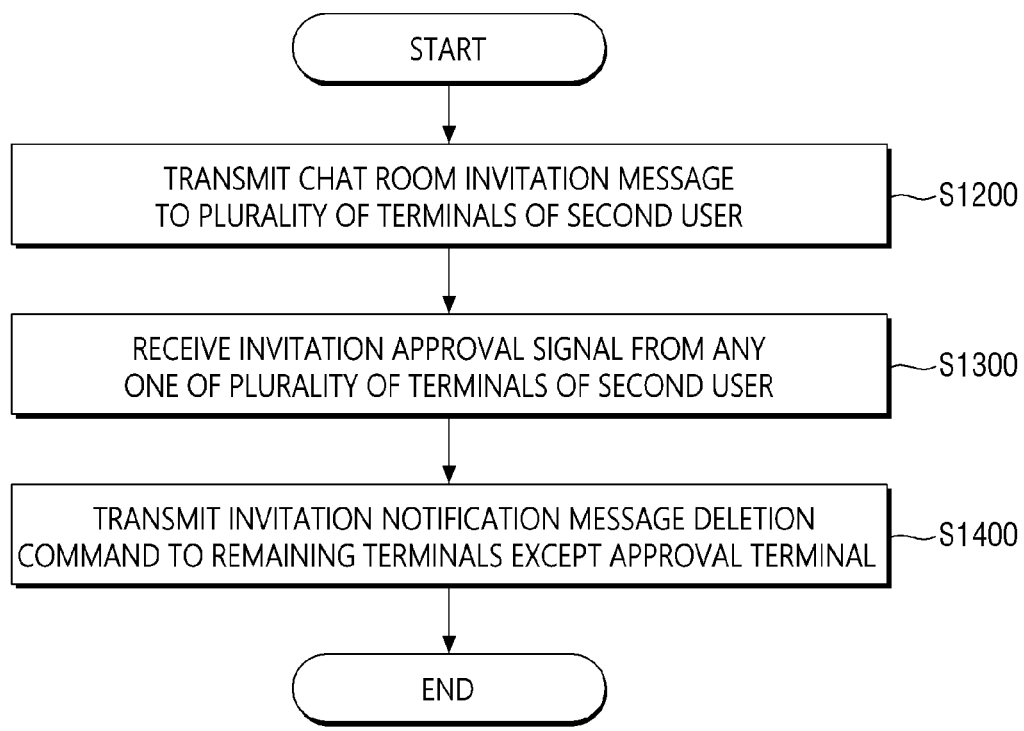
FIG. 8 is a flowchart of a method for transmitting and receiving a secure message according to another embodiment of the present disclosure.

FIG. 7 is a configuration diagram of a system for providing a secure message service according to this embodiment, and FIG. 8 is a flowchart of a method for providing a secure message service according to this embodiment. A chat room opening user is hereinafter referred to as a 'first user,' and a user who has registered a plurality of terminals is hereinafter referred to as a 'second user.'

When the first user's terminal 20 transmits a chat room invitation message to the second user as a counterpart, the chat room invitation message is transmitted to all terminals and 60 of the second user (S1200). That is, all terminals 50 and 60 of the second user will display the chat room invitation message.

Thereafter, by inputting an invitation approval signal to any one of a plurality of terminals, the second user may receive an invitation approval signal from the terminal 50 to which the invitation approval signal has been input (S1300). Among all the terminals 50 and of the second user, the terminal, to which the second user inputs invitation approval, is abbreviated as 'approval terminal' 50.

Upon receiving the invitation approval from the approval terminal 50, the messenger service server may transmit a chat room invitation notification message deletion command to the remaining terminals 60 of the second user except for the approval terminal 50 (S1400).

The remaining terminals 60 of the second user excluding the approval terminal may receive the chat room invitation notification message deletion command and remove the indication of the chat room invitation request displayed on the screen. In addition, the remaining terminals 60 of the second user may delete the record of the local DB for the chat room invitation request.

As a result, the approval terminal 50 becomes the only terminal of the second user registered in the chat room, and the risk of leakage of conversation contents that may be unintentionally caused by the remaining terminals 60 except for the approval terminal 50 may be reduced.

Thereafter, the step of the terminal 20 of the first user receiving only the public key of the approval terminal 50 from among the plurality of terminals registered by the second user from the public key management server 11 (S1310), the step of generating an encryption key using the public key of the approval terminal 50 and the private key of the terminal 20 of the first user (S1320), and the step of transmitting the generated encryption key to the approval terminal 50 (S1330) may proceed in the same way as steps S420, S430 and S500 described above.

In this embodiment, when the second user changes the terminal used for conversation with the first user from the approval terminal 50 to one of the remaining terminals 60, the second user may use one of the remaining terminals 60 to transmit an invitation message to the first user terminal 20. At this time, when the first user transmits an approval input for the invitation message, the approval terminal 50 will receive the chat room invitation notification message deletion command. As a result, the chat room with the first user is no longer displayed on the approval terminal 50.

That is, according to the present embodiment, a user is allowed to receive a secure message service using a plurality of terminals, but it is possible to prevent leakage of conversation content through a terminal that is not in use among the plurality of terminals by guaranteeing that only one terminal among the plurality of terminals displays a chat room with the counterpart at a specific time point.

Figure 9:
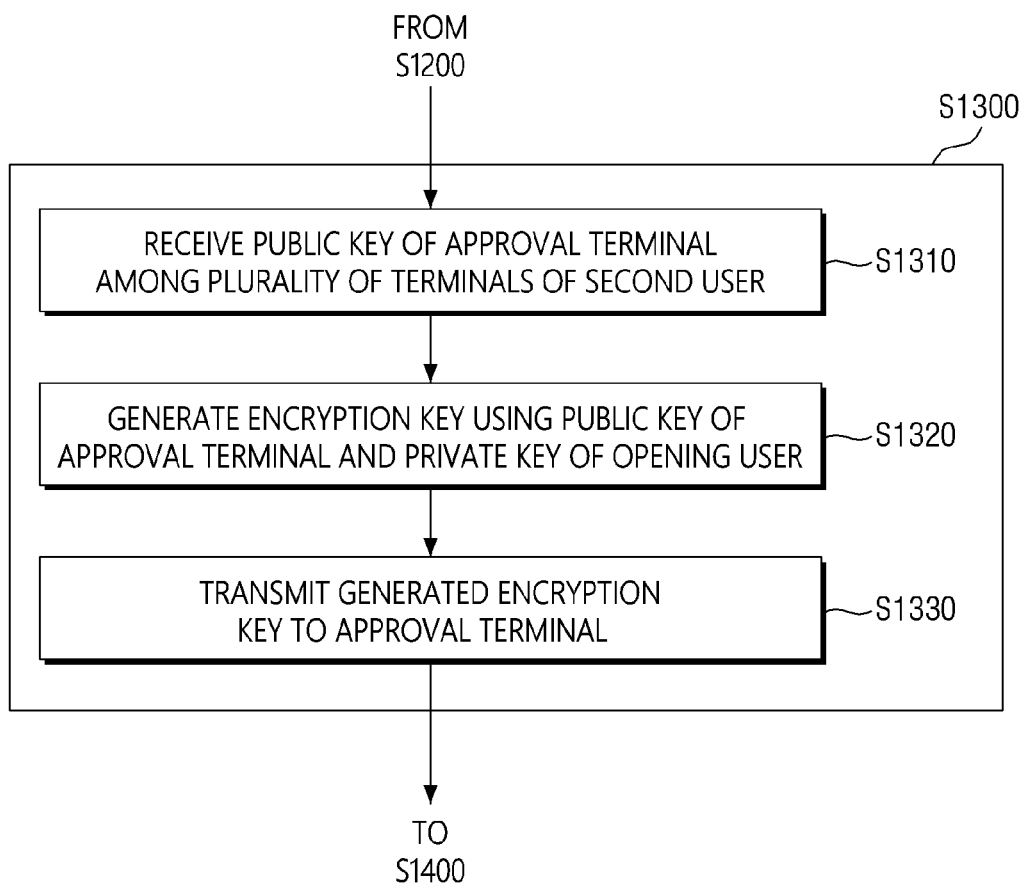
FIG. 9 is a detailed flowchart for describing in detail some of the operations described with reference to FIG. 8.
Figure 10:
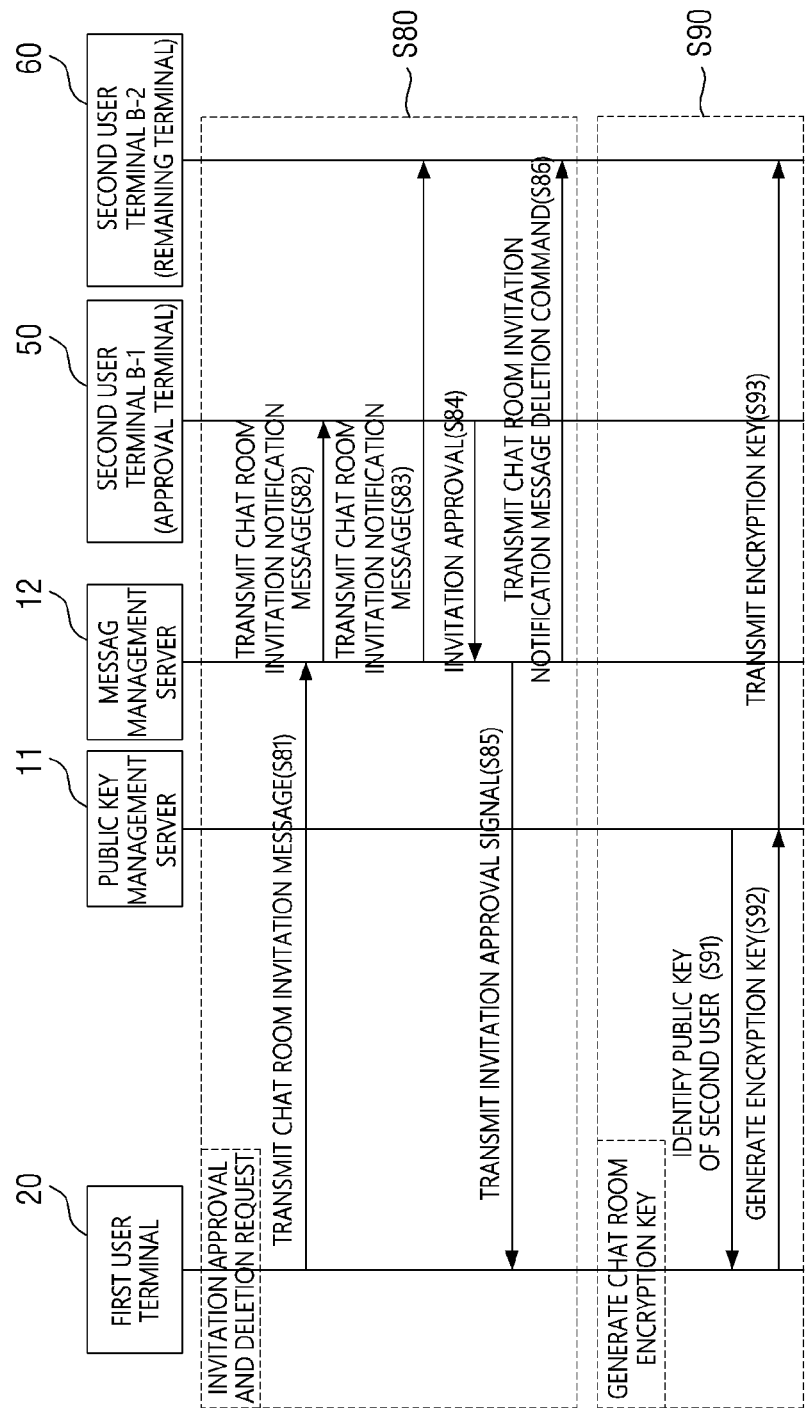
FIG. 10 is a signal flow diagram of the method for transmitting and receiving the secure message described with reference to FIGS. 8 and 9.

FIG. 10 is a signal flow diagram of the secure message transmission/reception method described with reference to FIGS. 8 and 9.

Referring to FIG. 10, when the second user is a user who has registered a plurality of user terminals, the process of transmitting a chat room invitation message to all of the plurality of user terminals 50 and 60 (S82, S83), and identifying the public key of the approval terminal 50 who approved the invitation (S85) (S91) from the server, generating a second encryption key (S92), and encrypting and transmitting (S93) a message using the second encryption key is shown step by step.

The chat room invitation related operation (S80) will be described. The first user terminal 20 transmits to the messenger service server 12 a chat room invitation message including identification information on the second user, who is the counterpart to be invited to the chat room (S81). The messenger service server 12 transmits the chat room invitation message to all of the terminals 50 and 60 of the second user (S82 and S83).

The invitation approval related operation (S80) will be described. When the invitation approval input of the second user is input to the approval terminal 50 of the terminals of the second user, the approval terminal 50 transmits an invitation approval signal to the message management server 12 (S84).

The message management server 12 transmits the invitation approval signal to the first user terminal 20 (S85). In addition, the message management server 12 transmits a chat room invitation notification message deletion command to all remaining terminals 60 except for the approval terminal 50 among terminals of the second user (S86).

A chat room encryption key generation related operation (S90) will be described. The first user terminal 20 receives the public key of the second user from the public key management server 11 (S91). The first user terminal 20 may generate an encryption key using the first user's private key and the second user's public key (S92), and share the generated encryption key to the approval terminal 50 of the second user through the public key management server 11 (S93).

On the other hand, as described above, in the present embodiment, the private key of the chat room opening user and the public key of the counterpart as well as the timestamp obtained at the time of generating the encryption key or the invitation approval password input by the counterpart upon invitation approval may be used to generate the encryption key.

The participant terminals 20 and 50 of the chat room may encrypt the input message and transmit/receive the encrypted message (S90).

Figure 11:
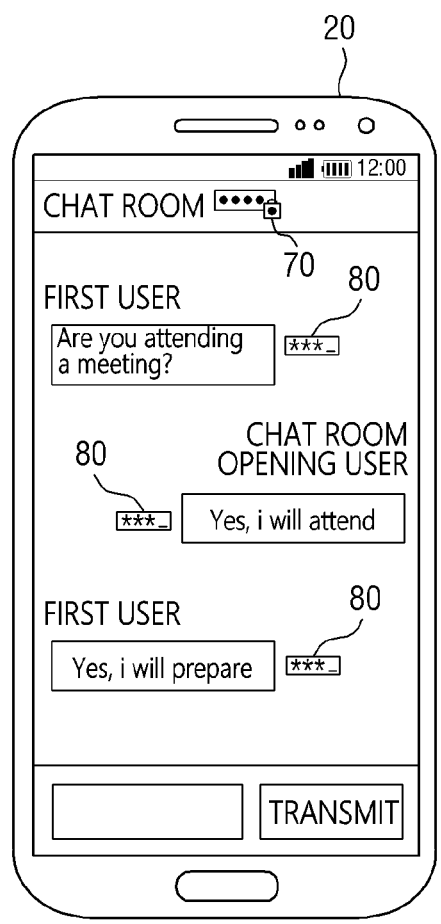
FIGS. 11 to 13 are diagrams illustrating exemplary screens that may be displayed on a user's terminal as a result of performing some embodiments of the present disclosure.

FIG. 11 shows an exemplary screen, in which, as a result of the above-described several embodiments, when a message is received and transmitted from the chat room opening user terminal 20, the opening user terminal 20 encrypts the message using an encryption key and transmits the message.

At this time, an icon 70 indicating a chat room, in which a secure messaging service is provided, and an icon 80 indicating that the message is to be encrypted/decrypted during transmission/reception may be additionally displayed on the screen.

Figure 12:
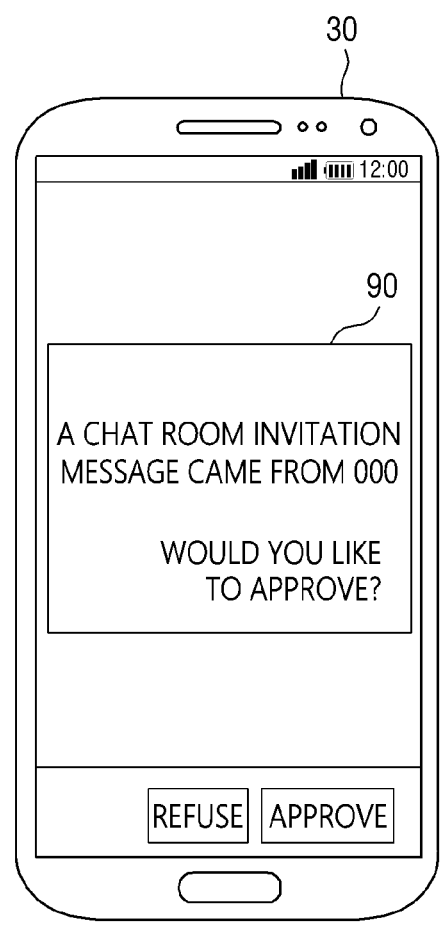
Figure 13:
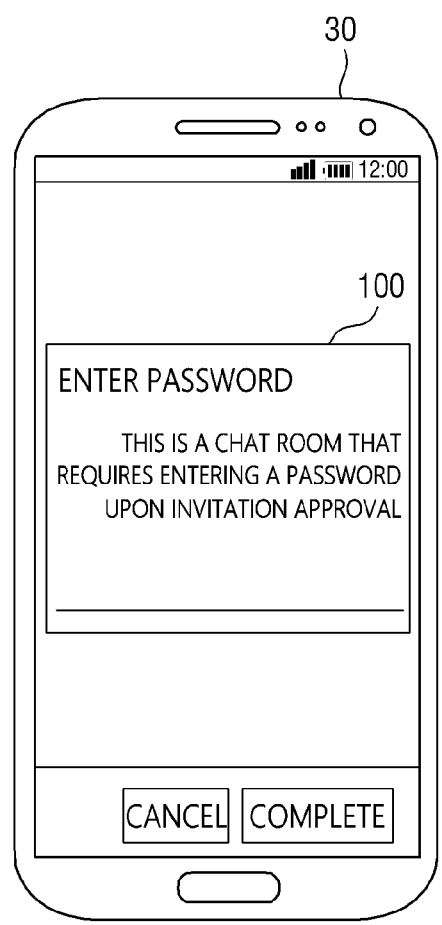

FIGS. 12 and 13 show an exemplary screen, in which, as a result of the above-described several embodiments, the counterpart user terminal 30 receives a chat room invitation message 90 from the chat room opening user terminal and, in response to the chat room invitation message, a password is set (100) together with the invitation approval.

Figure 14:
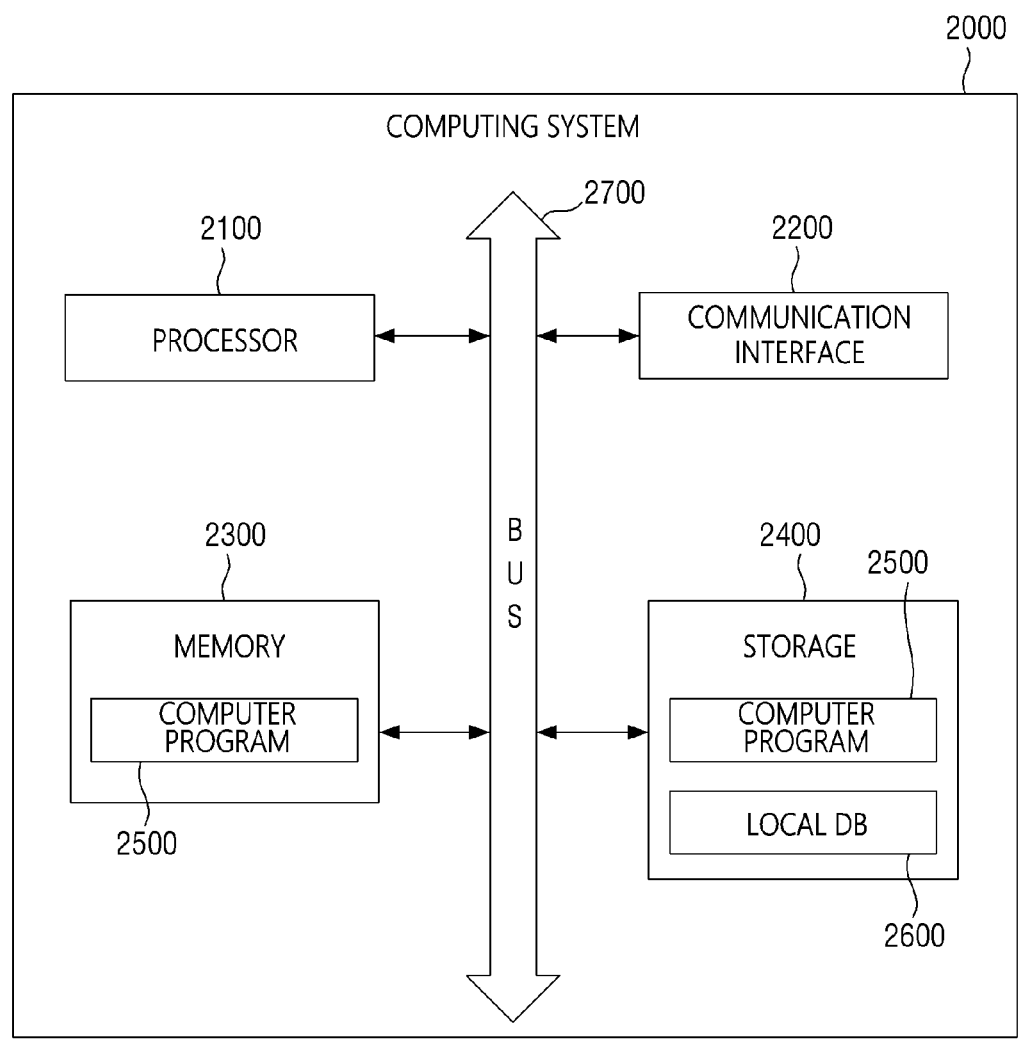
FIG. 14 is a hardware configuration diagram of a computing system that may be used as a component in some embodiments of the present disclosure.

FIG. 14 is a hardware configuration diagram of a computing device according to some embodiments of the present disclosure.

Referring to FIG. 14, a computing system 2000 may comprise one or more processors 2100, a system bus 2700, a communication interface 2200, a memory 2300 that loads a computer program 2500 executed by the processor 2100, and a storage 2400 that stores a computer program 2500 and a local DB 2600. For example, the computing system 2000 may be the user terminals 20, 30, and 40 described with reference to FIG. 1 or the service server 10.

The processor 2100 controls the overall operation of each component of the computing system 2000. The processor 2100 may perform an operation for at least one application or program for executing a method according to various embodiments of the present disclosure. The memory 2300 stores various data, commands and information. The memory 2300 may load one or more computer programs 2500 and the local DB 2600 from the storage 2400 to execute methods according to various embodiments of the present disclosure. The storage 2400 may non-temporarily store one or more computer programs 2500. The computer program 2500 may include one or more instructions in which methods according to various embodiments of the present disclosure are implemented. When the computer program 2500 is loaded into the memory 2300, the processor 2100 may execute methods according to various embodiments of the present disclosure by executing the one or more instructions.

The computer program 2500 may include an instruction for receiving and storing a public key from a user's terminal and, an instruction of, in response to a public key inquiry request received from a terminal of a user who opened a chat room, transmitting the public key of the counterpart who is invited to the chat room to the terminal of the user who opened the chat room, an instruction for receiving an encryption key related to the chat room from the terminal of the user who opened the chat room, and an instruction for transmitting the received encryption key to the terminal of the counterpart user. In this case, the encryption key may be generated using the public key of the counterpart user and the private key of the user who opened the chat room.

The local DB 2600 may include one or more related records according to various embodiments of the present disclosure. When the local DB 2600 is loaded into the memory 2300, the processor 2100 may perform methods according to various embodiments of the present disclosure by reading the one or more related records.

The local DB 2600 includes records related to the public key received and stored by the user's terminals, records related to the chat room invitation message between the user terminals, and records related to the delivery of the encryption key generated with the public key and the private key of the chat room opening user to the user terminals.

Embodiments of the present disclosure have been described above with reference to FIGS. 1 through 14, but the present disclosure is not limited thereto and may be implemented in various different forms. It will be understood that the present disclosure may be implemented in other specific forms without changing the technical spirit or gist of the present disclosure. Therefore, it should be understood that the embodiments set forth herein are illustrative in all respects and not limiting.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multi-tasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method performed by a computing system for transmitting and receiving a secure message, the method comprising:
    inquiring a public key of a counterpart user to be invited to a chat room;
    transmitting a chat room invitation message to a terminal of the counterpart user, the chat room invitation message requesting the counterpart user to enter an invitation approval password upon invitation approval;
    receiving, from the terminal of the counterpart user, an approval response to the chat room invitation message, the approval response including the invitation approval password that is encrypted using the public key of the counterpart user;
    generating an encryption key related to the chat room using a public key of a counterpart user who transmitted the approval response among the inquired public key, the invitation approval password, and a private key of a chat room opening user; and
    transmitting the encryption key to be delivered to the terminal of the counterpart user.

2. The method of claim 1, wherein the inquired public key is generated by the terminal of the counterpart user based on the terminal of the counterpart user logging in to a secure messaging service, and registered in a service server.

3. The method of claim 2, wherein the inquired public key is generated by the terminal of the counterpart user based on identification information of the terminal of the counterpart user.

4. The method of claim 1, wherein the generating the encryption key comprises:
    generating the encryption key related to the chat room further based on a timestamp at a generation time point of the encryption key.

5. The method of claim 1, further comprising:
    encrypting a message input to the chat room by the chat room opening user with the encryption key and transmitting the encrypted message.

6. The method of claim 1, further comprising:
    encrypting property information of the chat room with the encryption key and transmitting the encrypted property information.

7. A method performed by a computing system for transmitting and receiving a secure message, the method comprising:
    inquiring a public key of a counterpart user to be invited to a chat room;
    generating an encryption key related to the chat room using the inquired public key and a private key of a chat room opening user;
    transmitting the encryption key to be delivered to a terminal of the counterpart user;
    receiving an invitation command for a new user;
    updating the encryption key related to the chat room based on a public key of the new user, the public key of the counterpart user, and the private key of the chat room opening user; and
    transmitting the updated encryption key to be delivered to the terminal of the counterpart user and a terminal of the new user.

8. The method of claim 1,
    wherein the counterpart user is a user who has registered a plurality of user terminals, and
    wherein the method further comprises:
    transmitting the chat room invitation message to each of the plurality of user terminals of the counterpart user;
    receiving an approval signal for the chat room invitation message from one of the plurality of user terminals of the counterpart user; and
    transmitting a notification message deletion command for the chat room invitation message to remaining user terminals, other than an approval terminal that transmitted the approval signal, among the plurality of user terminals of the counterpart user.

9. The method of claim 8, wherein the notification message deletion command is a command for causing a user terminal receiving the notification message deletion command to remove an indication of the chat room invitation message and delete a record of a local database (DB) for the chat room invitation message.

10. The method of claim 8, further comprises:
    receiving identification information of the approval terminal.

11. The method of claim 8, wherein
    receiving, from the terminal of the chat room opening user, a message encrypted based on the encryption key; and transmitting the encrypted message only to the approval terminal among the plurality of user terminals of the counterpart user.

12. A method performed by a computing system for transmitting and receiving a secure message, the method comprising:
  generating a first encryption key related to a first chat room for a conversation with a first counterpart user based on a public key of the first counterpart user and a private key of a chat room opening user;
  encrypting and transmitting a message input to the first chat room based on the first encryption key;
  generating a second encryption key related to a second chat room for a conversation with the first counterpart user and a second counterpart user based on the public key of the first counterpart user, a public key of the second counterpart user, and the private key of the chat room opening user; and
  encrypting and transmitting a message input to the second chat room based on the second encryption key.

13. An apparatus for transmitting and receiving a secure message, the apparatus comprising:
  at least one processor; and
  at least one memory configured to store computer program executable by the at least one processor,
  wherein the computer program, when executed by the at least one processor, causes the at least one processor to perform:
    receiving and storing a public key from a terminal of a user;
    in response to a public key inquiry request received from a terminal of a first user who opens a chat room, transmitting a public key of a counterpart user who is invited to the chat room to the terminal of the first user;
    transmitting a chat room invitation message to a terminal of the counterpart user, the chat room invitation message requesting the counterpart user to enter an invitation approval password upon invitation approval;
    receiving, from the terminal of the counterpart user, an approval response to the chat room invitation message, the approval response including the invitation approval password that is encrypted using the public key of the counterpart user;
    transmitting the approval response including the encrypted invitation approval password to the terminal of the first user;
    receiving an encryption key related to the chat room from the terminal of the first user; and
    delivering the received encryption key to the terminal of the counterpart user,
    wherein the encryption key is generated based on a public key of the counterpart user who transmitted the approval response, the invitation approval password, and a private key of the first user.

* * * * *